Aug. 2, 1927.  
W. M. EGGERS ET AL  
1,637,607  
SPRING OPENED CLIPPING SHEARS  
Filed July 21, 1924
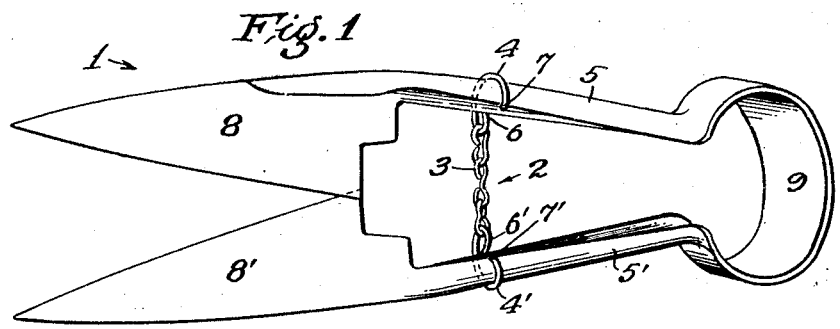
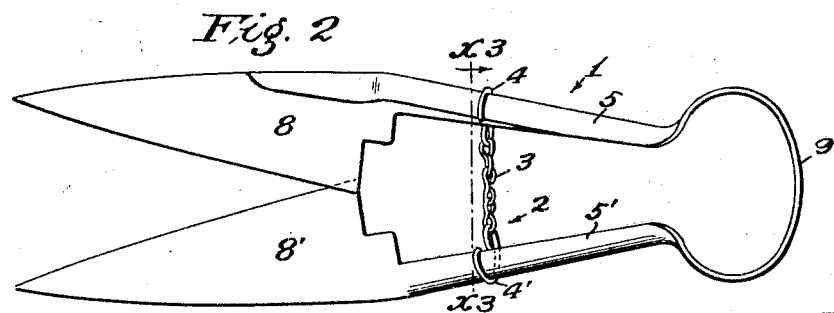
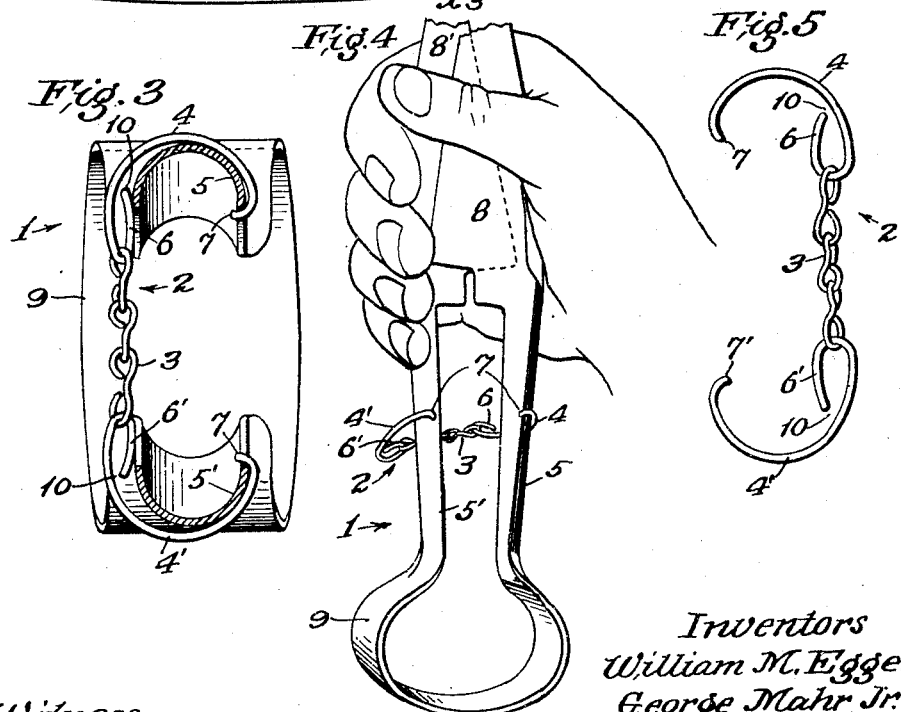
Witness  
C. C. Holly
Inventors  
William M. Eggers  
George Mahr Jr.  
by James R. Townsend  
Their atty Patented Aug. 2, 1927.

1,637,607

UNITED STATES PATENT OFFICE.

WILLIAM M. EGGERS AND GEORGE MAHR, JR., OF LOS ANGELES, CALIFORNIA, ASSIGNORS OF ONE-THIRD TO JAMES R. TOWNSEND, OF LOS ANGELES, CALIFORNIA, AND TWO-THIRDS TO SAID MAHR.

SPRING-OPENED CLIPPING SHEARS.

Application filed July 21, 1924. Serial No. 727,177.

This invention relates to shears, such as those which are used in shearing sheep, clipping grass, trimming roses and the tender shoots of hedges.

In such shears the blades are connected by a spring loop, and they are offset from a central plane so as to hold the cutting edges of the shears in contact with each other during the operation of the shears, and when the shears are left free it frequently occurs that the tension of the spring loop is such that the blades are thrown apart so that they do not mesh properly.

An object of this invention is to make provision whereby any required tension can be given to the spring loop without throwing the blades out of proper engagement with each other when not confined by the fingers of the hand or at any other time.

In this invention we provide two frictionally held, slidable shackles to engage the shanks of the blades, and to be slidably adjustable therealong and connect such shackles together by a flexible connection which is free to sag to allow the blades to be closed upon each other, but is of such length that when the shanks are released the blades are still held in mesh.

The invention comprises an ordinary pair of spring operated clipping or pruning shears and shackles adapted to slip onto the handles or shanks of said shears at a proper point, and which shackles are connected together by a flexible connection adapted to prevent the blades of the shears from separating too widely and at the same time to not interfere with the closing of said shears.

An object of the invention is to provide a simple attachment easily applicable to any clipping shears of the character stated, and which will hold the shears at any spread or adjustment of tension.

Cheapness is another object.

Another object is to provide a simple attachment of the character set forth, which can easily and quickly be attached and detached from the shears.

Another object is to provide a device that can be easily attached, detached and adjusted without the use of a screw driver.

Another object is to save time and labor in adjusting the spread of spring opened shears.

The invention includes a cheap and simple device adapted to be applied to shears of the character stated, either at the factory, in the market or in the hands of the user.

Other objects, advantages and features of invention may appear from the accompanying drawing, the subjoined detail description and the appended claim.

The accompanying drawing illustrates the invention.

Figure 1 is a perspective side view of the shears.

Fig. 2 is a plain side view.

Fig. 3 is an enlarged sectional view taken on line $x^3$, Fig. 2, looking in the direction of the arrow.

Fig. 4 is a fragmental perspective view of the shears in closed position as they would appear in the hand of the user in the act of applying the shackles.

Fig. 5 shows one of the shackles detached from the shears.

An ordinary pair of spring opened pruning or clipping shears 1 is supplied with a pair of slidingly adjustable shackles 2 in the form of hooks connected by a short flexible connection such as a chain 3 or other flexible connecting member. The shackles are provided at each end with terminal hooks 4, 4' of sufficient size to hook over shanks or handles 5, 5' of the shears 1; the hooks 4, 4' being preferably formed of spring wire and bent at one end to form spring loops 6, 6' adapted to fit closely onto handles 5, 5' of various sizes, and being held in contact by the spring loops 6, 6'. The other ends of the shackles are provided with retaining hooks 7, 7' which may be caught over the edges of the handles 5, 5' when said handles are fully or partly in the position shown in Fig. 4.

When the blades are released as shown in Figs. 1, 2 and 3, the chain 3 will be held taut by the pressure of the shears, on the shackles, the blades 8, 8' of which are spread apart by the action of the spring loop 9 of the handle.

The shackles 2 may be adjusted to and from shears of different sizes by merely slipping the shackles on the handles 5, 5' toward and from the blades 8, 8'.

The loops 6, 6' are of such width that the tendency of said loops is to cause the hooks to hug the shanks of the shears; and the terminal hooks 7, 7' are sufficiently bent over, to engage the edges of the shear shanks to hold them from spreading too far apart; but open spaces 10 are provided to allow the hooks to be considerably compressed in the operation of applying and disassembling the shackles from the shears.

The shanks of the shears shown in the drawings diverge from the loop toward the blades and by adjusting the shackles to their appropriate place on the shanks they will hold the blades in proper position and the friction between the shanks and shackles will hold the shackles in the adjusted position.

To remove the attachment, the blades may be grasped by one hand of the operator, and the end of one shackle may then be swung around from its shank thus releasing the shackle from the shank.

We claim:

The unitary spring opened shears set forth having shackles adjustable along the shanks of the shears and flexible connections for the shackles adapted to hold the blades of the shears from spreading out of mesh; said shackles being frictionally held and adapted to be easily adjustable either toward or from the blades of the shears to change the spread limit of the blades.

In testimony whereof, we have hereunto set our hands at Los Angeles, California, this 16th day of July, 1924.

WILLIAM M. EGGERS.
GEORGE MAHR, Jr.